United States Patent
Cappiello et al.

(10) Patent No.: US 6,859,317 B1
(45) Date of Patent: Feb. 22, 2005

(54) DIFFRACTION GRATING FOR WAVELENGTH DIVISION MULTIPLEXING/DEMULTIPLEXING DEVICES

(75) Inventors: Gregory G. Cappiello, Windham, NH (US); Mikhail N. Sokolskiy, St. Petersburg (RU); Robert H. Dueck, Santa Ana, CA (US)

(73) Assignee: Confluent Photonics Corporation, Salem, NH (US)

( * ) Notice: Subject to any disclaimer, the term of this patent is extended or adjusted under 35 U.S.C. 154(b) by 0 days.

(21) Appl. No.: 09/724,803

(22) Filed: Nov. 28, 2000

Related U.S. Application Data

(60) Provisional application No. 60/208,483, filed on Jun. 2, 2000, provisional application No. 60/208,482, filed on Jun. 2, 2000, provisional application No. 60/208,478, filed on Jun. 2, 2000, and provisional application No. 60/208,477, filed on Jun. 2, 2000.

(51) Int. Cl.[7] .................................................. G02B 5/18
(52) U.S. Cl. .......................... 359/569; 359/571; 398/87
(58) Field of Search ................................ 359/569, 571, 359/572, 576, 566; 398/87

(56) References Cited

U.S. PATENT DOCUMENTS

| | | | |
|---|---|---|---|
| 4,111,524 A | 9/1978 | Tomlinson, III | 350/96.19 |
| 4,198,117 A | 4/1980 | Kobayashi | 350/96.19 |
| 4,299,488 A | 11/1981 | Tomlinson, III | 356/328 |
| 4,343,532 A | 8/1982 | Palmer | 350/96.19 |
| 4,652,080 A | 3/1987 | Carter et al. | 350/96.19 |
| 4,736,360 A * | 4/1988 | McMahon | 370/3 |
| 4,741,588 A | 5/1988 | Nicia et al. | 350/96.19 |
| 4,857,726 A | 8/1989 | Kinney et al. | 250/226 |
| 4,926,412 A | 5/1990 | Jannson et al. | 370/3 |
| 4,930,855 A | 6/1990 | Clark et al. | 350/96.19 |
| 5,026,131 A | 6/1991 | Jannson et al. | 350/3.7 |
| 5,278,687 A | 1/1994 | Jannson et al. | 359/125 |
| 5,363,220 A | 11/1994 | Kuwayama et al. | 359/3 |
| 5,457,573 A | 10/1995 | Iida et al. | 359/569 |
| 5,526,155 A | 6/1996 | Knox et al. | 359/130 |
| 5,555,334 A | 9/1996 | Ohnishi et al. | 385/93 |
| 5,583,683 A | 12/1996 | Scobey | 359/127 |
| 5,748,815 A | 5/1998 | Hamel et al. | 385/37 |
| 5,777,763 A | 7/1998 | Tomlinson, III | 359/130 |
| 5,796,479 A * | 8/1998 | Derickson et al. | 356/326 |
| 5,937,113 A * | 8/1999 | He et al. | 385/11 |
| 5,970,190 A * | 10/1999 | Fu et al. | 385/37 |
| 6,067,197 A * | 5/2000 | Blasiak et al. | 359/571 |
| 6,487,019 B2 * | 11/2002 | Hoose | 359/575 |
| 6,577,786 B1 * | 6/2003 | Cappiello et al. | 385/24 |

FOREIGN PATENT DOCUMENTS

| | | |
|---|---|---|
| EP | 0 297 437 A2 | 1/1989 |
| WO | WO 01/07947 A1 | 1/2001 |

OTHER PUBLICATIONS

Loewen, E. and Popov. Diffraction Gratings and Applications. N.Y., Marcel Dekker, 1997. pp. 36–37.*

U.S. Appl. No. 09/382,492, filed Aug. 25, 1999, Wade.

U.S. Appl. No. 09/545,826, filed Apr. 10, 2000, Cappiello et al.

U.S. Appl. No. 09/724,771, filed Nov. 28, 2000, Cappiello et al.

(List continued on next page.)

*Primary Examiner*—Mark A. Robinson
*Assistant Examiner*—Alessandro Amari
(74) *Attorney, Agent, or Firm*—Hunton & Williams LLP

(57) ABSTRACT

A diffraction grating for optical communication is disclosed. The diffraction grating includes a substrate and a reflective material adjacent the substrate, wherein one or more input optical signals incident the reflective material is diffracted into one or more output optical signals over a wavelength range of at least approximately 30 nm, within which the diffraction grating is substantially polarization insensitive.

54 Claims, 12 Drawing Sheets

OTHER PUBLICATIONS

U.S. Appl. No. 09/724,770, filed Nov. 28, 2000, Cappiello et al.
U.S. Appl. No. 09/724,638, filed Nov. 28, 2000, Cappiello.
U.S. Appl. No. 09/724,604, filed Nov. 28, 2000, Cappiello.
U.S. Appl. No. 09/724,717, filed Nov. 28, 2000, Sussman et al.
U.S. Appl. No. 09/724,804, filed Nov. 28, 2000, Cappiello et al.

* cited by examiner

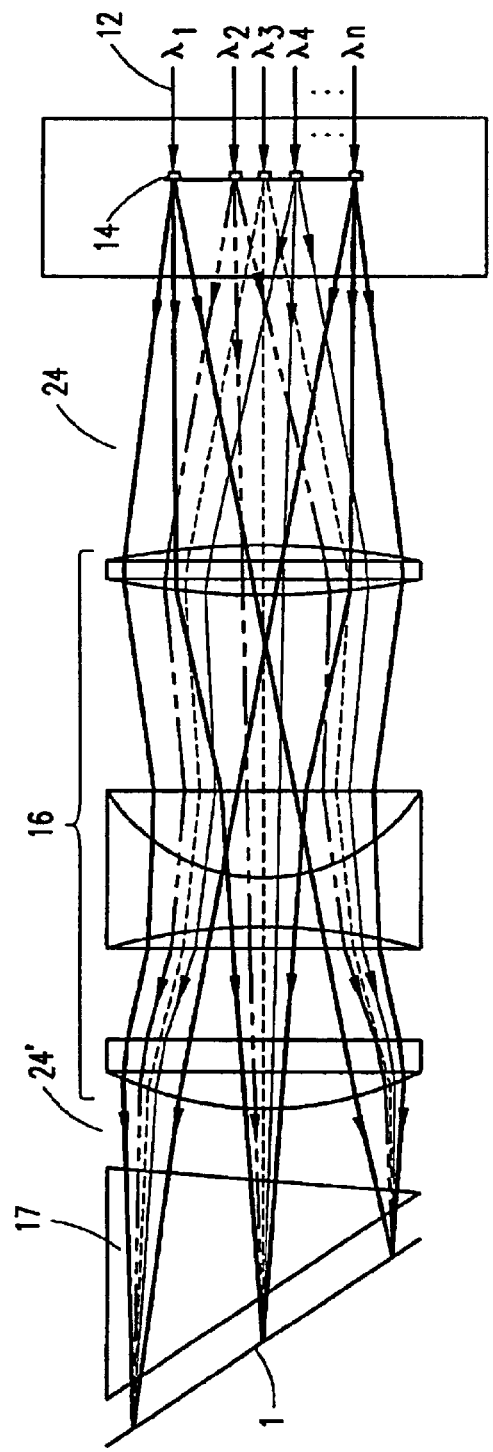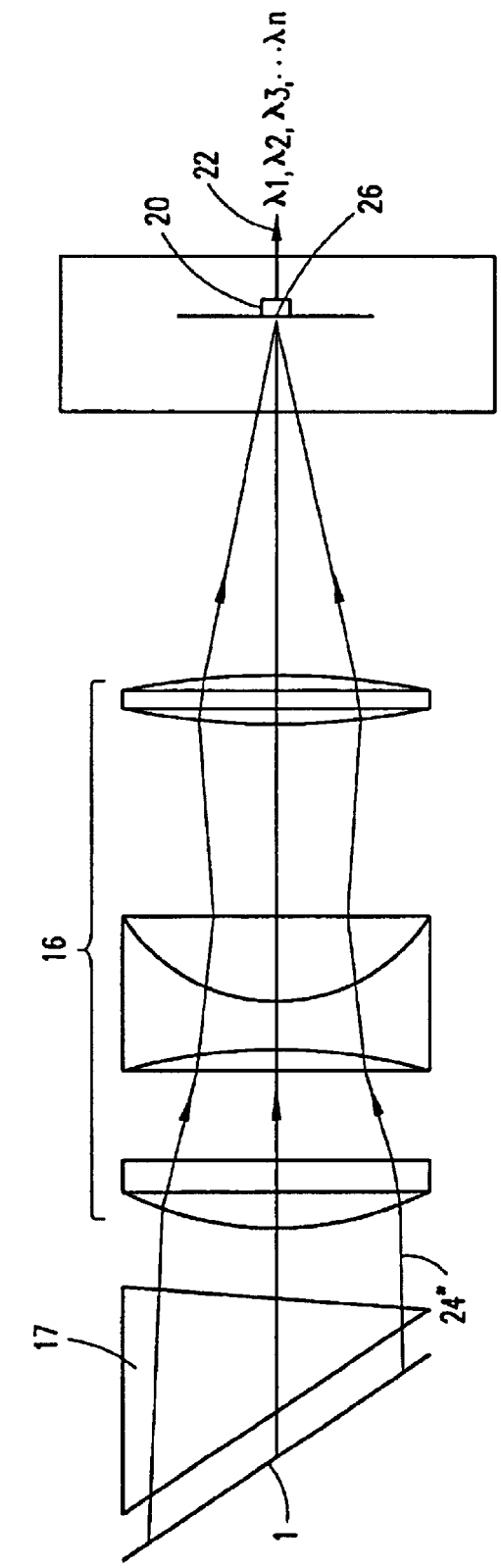
FIG. 10A
FIG. 10B

DIFFRACTION GRATING FOR WAVELENGTH DIVISION MULTIPLEXING/DEMULTIPLEXING DEVICES

CROSS-REFERENCE TO RELATED APPLICATIONS

This patent application is related to and claims priority from U.S. Patent Application No. 60/208,478, filed Jun. 2, 2000; U.S. Patent Application 60/208,482, filed Jun. 2, 2000; U.S. Patent Application 60/208,477, filed Jun. 2, 2000; and U.S. Patent Application 60/208,483, filed Jun. 2, 2000. This application is also related to U.S. patent application Ser. No. 09/382,492, filed Aug. 25, 1999; U.S. patent application Ser. No. 09/545,826, filed Apr. 10, 2000; U.S. Patent Application No. 60/208,482; filed Jun. 2, 2000, entitled "ATHERMALIZATION AND PRESSURE DESENSITIZATION OF DIFFRACTION GRATING BASED WDM DEVICES"; U.S. Pat. No. 6,621,958, filed Jun. 2, 2000, entitled "ATHERMALIZATION AND PRESSURE DESENSITIZATION OF DIFFRACTION GRATING BASED WDM DEVICES"; U.S. Pat. No. 6,570,652, filed Jun. 2, 2000, entitled "ATHERMALIZATION AND PRESSURE DESENSITIZATION OF DIFFRACTION GRATING EASED SPECTROMETER DEVICES"; U.S. Pat. No. 6,586,297, filed Jun. 2, 2000, entitled "ATHERMALIZATION AND PRESSURE DESENSITIZATION OF DIFFRACTION GRATING BASED SPECTROMETER DEVICES"; U.S. Pat. No. 6,820,843, filed Jun. 2, 2000, entitled "OPTICAL PERFORMANCE MONITOR WITH OPTIMIZED FOCUS SPOT SIZE", and U.S. Pat. No. 6,577,786, filed Jun. 2, 2000, entitled "DEVICE AND METHOD FOR OPTICAL PERFORMANCE MONITORING IN AN OPTICAL COMMUNICATIONS NETWORK". The above-listed applications are hereby incorporated by reference in their entirety.

FIELD OF THE INVENTION

The present invention relates generally to wavelength division multiplexing and, more particularly, to a diffraction grating for relatively high efficiency wavelength division multiplexing/demultiplexing devices.

BACKGROUND OF THE INVENTION

Optical communication technology relies on wavelength division multiplexing (WDM) to provide increased bandwidth over existing installed fiber optic lines, as well as newly deployed fiber optic line installations. Several technologies exist to provide the technical solution to WDM: array waveguide gratings (AWG's), fiber Bragg grating based systems, interference filter based systems, Mach-Zehnder interferometric based systems, and diffraction grating based systems, to name a few. Each system has advantages and disadvantages over the others.

Diffraction grating based systems have the advantage of parallelism, which yields higher performance and lower cost for high channel count systems. In particular, a diffraction grating is a device that diffracts light by an amount varying according to its wavelength. For example, if sunlight falls on a diffraction grating at the correct angle, the sunlight is broken up into its individual component colors (i.e., rainbow).

Gratings work in both transmission (where light passes through a material with a grating written on its surface) and in reflection (where light is reflected from a material with a grating written on its surface). In optical communications, reflective gratings have a widespread use. A reflective diffraction grating includes a very closely spaced set of parallel lines or grooves made in a mirror surface of a solid material. A grating can be formed in most materials wherein the optical properties thereof are varied in a regular way, having a period that is relatively close to the wavelength. Incident light rays are reflected from different lines or grooves in the grating. Interference effects prevent reflections that are not in-phase with each other from propagating.

There are two primary groove profiles in conventional diffraction gratings, blazed gratings and sinusoidal gratings. The blazed grating includes a jagged or sawtooth shaped profile. The sinusoidal grating has a sinusoidal profile along the surface of the grating.

The diffraction equation for a grating is generally described by $$Gm\lambda = n(\sin(\alpha) + \sin(\beta))$$

where, $G=1/d$ is the groove frequency in grooves per millimeter and d is the distance between adjacent grooves, m is the diffraction order, $\lambda$ is the wavelength of light in millimeters, $\alpha$ is the incident angle with respect to the grating normal, $\beta$ is the exiting angle with respect to the grating normal, and n is the refractive index of the medium above the grooves.

FIG. 12A is a representative pictorial showing optical characteristics of a blazed diffraction grating in reflecting a narrowband optical signal. The blaze diffraction grating 900 is defined by certain physical parameters that effect optical performance. These physical parameters include the reflection surface material, the number of grooves g per millimeter, blaze angle $\theta_B$, and the index of refraction of an immersed grating medium 902. The reflection surface 905 typically resides on a substrate 910.

As shown on FIG. 12A, the groove spacing is defined by d. An incident narrowband optical signal with a center wavelength $\lambda_1$ has an incident angle $\alpha_1$ (measured from the grating normal $N_q$) and a reflection angle $\beta_1$ (also measured from the grating normal $N_g$). The angle between the grating normal $N_g$ and the facet normal $N_f$ defines the blaze angle $\theta_B$.

As previously discussed, when narrowband light is incident on a grating surface, it is diffracted in discrete directions. The light diffracted from each groove of the grating combines to form a diffracted wavefront. There exists a unique set of discrete or distinct angles based upon a given spacing between grooves that the diffracted light from each facet is in phase with the diffracted light from any other facet. At these discrete angles, the in-phase diffracted light combine constructively to form the reflected narrowband light signal.

A sinusoidal diffraction grating is similarly described by the equation above. When $\alpha=\beta$, the reflected light is diffracted directly back toward the direction from which the incident light was received. This is known as the Littrow condition. At the Littrow condition, the diffraction grating equation becomes $$m*\lambda = 2*d*n*\sin(\alpha),$$

where n is the index of refraction of the immersed grating medium 902 in which the diffraction grating is immersed.

FIG. 12B is a representative pictorial showing optical characteristics of a sinusoidal diffraction grating. Sinusoidal gratings, however, do not have a blaze angle parameter, but rather have groove depth (d). An immersed grating medium 955 resides on the sinusoidal grating 950 having a certain index of refraction, n. The diffraction grating equation discussed above describes the optical characteristics of the sinusoidal diffraction grating 19d based upon the physical characteristics thereof.

FIG. 12c shows a polychromatic light ray being diffracted from a blazed grating 960. An incident ray (at an incident angle $\theta_1$ to the normal) is projected onto the blazed grating 960. A number of reflected and refracted rays are produced corresponding to different diffraction orders (values of m–0, 1, 2, 3 . . . ). The reflected rays corresponding to the diffraction order having the highest efficiency (i.e., lowest loss) are utilized in optical systems.

As with most communications systems, there is a need to provide improved optical transmission rate and more efficient propagation of the communication signals in the fiber optic communication system. By improving the efficiency and/or decreasing the loss of the communication signals, the need to install optical repeaters and/or optical amplifiers is reduced, thereby decreasing operating costs of the system. Furthermore, an increase in signal efficiency reduces demand on fiber optic lines in a system, thereby reducing the need for burying additional optic lines. The burying of additional fiber optic cable is quite costly as it is presently on the order of $15,000 to $40,000 per kilometer.

Because WDM devices generate optical signals, one area of improvement is focused on the insensitivity to signal polarization. As is well known, the polarization of a signal affects the speed at which pulse energy in the signal's polarization modes or states propagate in an optical fiber. As a result, polarized signals generally cause significant timing and signal reconstruction problems within an optical system.

Ultimately, signal performance within a WDM device is attributable to a great extent to the performance of the diffraction grating therein. Because the parameter values which describe the diffraction grating often dictate the efficiency and the polarization effects of diffracted optical signals, much time, money, and effort have been dedicated to determining diffraction grating parameter values to effectuate improved transmission performance. Due in part to the number of diffraction grating parameters, the considerable range of corresponding parameter values, and the interdependencies between the diffraction grating parameters, designing and implementing a diffraction grating yielding improved performance are nontrivial.

In this regard, designing diffraction gratings must additionally take into account real-world effects that can only be measured empirically to determine if the theoretical parameters for a diffraction grating yield a viable solution. For example, one difficulty in creating improved diffraction gratings is the prolonged time period for creating a master diffraction grating. A single diffraction grating master may take several weeks to produce. Although the master diffraction grating, having a specific set of grating parameters, may yield acceptable results (i.e., low loss or a partially polarization insensitive result), a replicated diffraction grating created from the master diffraction grating may produce less than desirable signal performance characteristics. Consequently, the process of designing and developing diffraction gratings (determining grating parameters that yield good signal and/or master grating related characteristics, producing a master diffraction grating having the determined grating parameters and producing a replicated diffraction grating from the master diffraction grating that yields good signal performance characteristics) so as to produce a diffraction grating having improved performance requires solving both theoretical and practical problems.

Based upon the foregoing, there is a need for a diffraction grating for employment within an optical system having improved signal performance.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF EXEMPLARY EMBODIMENTS

Figure 1A:
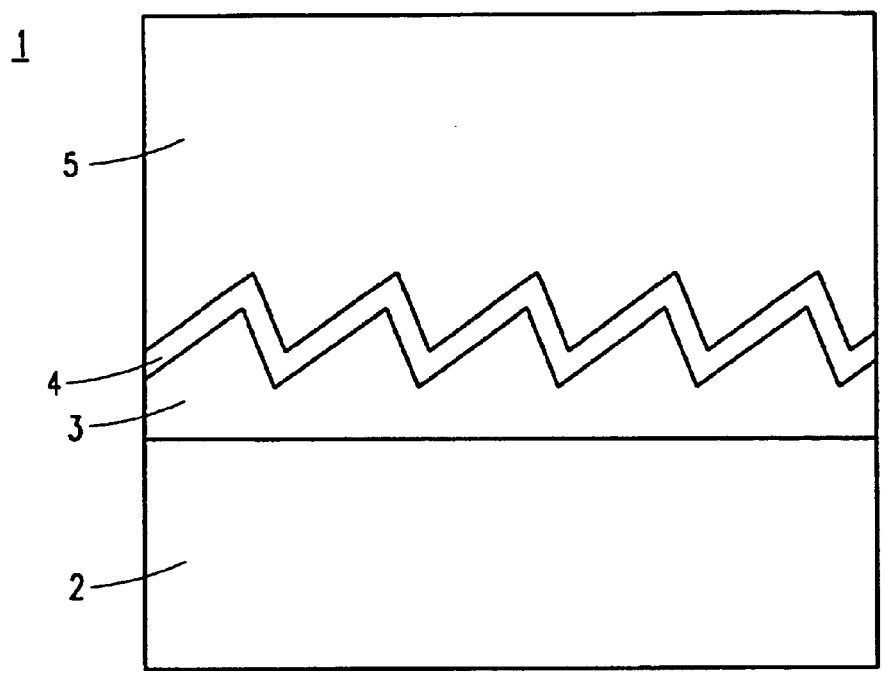
FIGS. 1A and 1B illustrate diffraction grating profiles according to various embodiments of the present invention.

The present invention will now be described more fully hereinafter with reference to the accompanying drawings in which a preferred embodiment of the invention is shown.

Optical networks are utilized to handle telecommunications traffic caused in part by the Internet, mobile communications, and facsimile communications. To increase the bandwidth of optical networks, polychromatic fiber optic lines and/or carriers have been developed to allow for multiple signals to be carried by a single fiber optic line. A central component utilized in fiber optic communication is a wavelength division multiplexer/demultiplexer (WDM). WDM devices transmit polychromatic optical signals into and receive polychromatic optical signals from polychromatic fiber optic lines. Within the WDM, a diffraction grating is utilized to join a multiple number of narrowband optical signals into a polychromatic optical signal in the multiplexing case, and separate a polychromatic optical signal into a multiple number of narrowband optical signals in the demultiplexing case. So that the WDM provides for high efficiency, embodiments of the present invention include a diffraction grating that is polarization insensitive.

In practice, narrowband optical signals or beams are not truly monochromatic, but rather a tight range of wavelengths. Each signal is defined by a narrow passband and has a center wavelength which is the representative wavelength to which an optical signal is associated. Each center wavelength is generally predefined, and may correspond with an industry standard, such as the standards set by the International Telecommunication Union.

An optics device may be described as being "polarization insensitive" if the power levels of the polarization states of one or more optical signals emitted from the device is the same as the power levels of polarization states of corresponding optical input signal(s) to the device. In other words, the device provides equal efficiency for both of the polarization states of the output optical signal(s) emitted from the device. Relatedly, a device is "substantially polarization insensitive" if the power levels of the polarization states of output optical signal(s) emitted from the device are within approximately 20% of the power levels of the corresponding polarization states of input optical signal(s) to the device.

Further, the term "apolarized" is used below in describing the various embodiments of the present invention as meaning a signal condition in which the power of the transverse electric polarization state TE is equal to the power of the transverse magnetic polarization state TM at a pertinent wavelength or set of wavelengths. The term "substantially apolarized" is used below as referring to a signal condition in which the power of the transverse electric polarization state TE and the power of the transverse magnetic polarization state TM are within about 20% of each other at a pertinent wavelength or set of wavelengths. The term "efficiency" used below refers to a characteristic of an optical device. In particular, "efficiency" is used to mean the gain/loss of an optical signal or signal component generated from the optical device, relative to an optical signal received thereat. Relatedly, "polarization dependent loss" or "PDL" refers to a characteristic of an optical device, and is used below to mean the maximum deviation in gain/loss across all input polarization states.

Figure 1B:
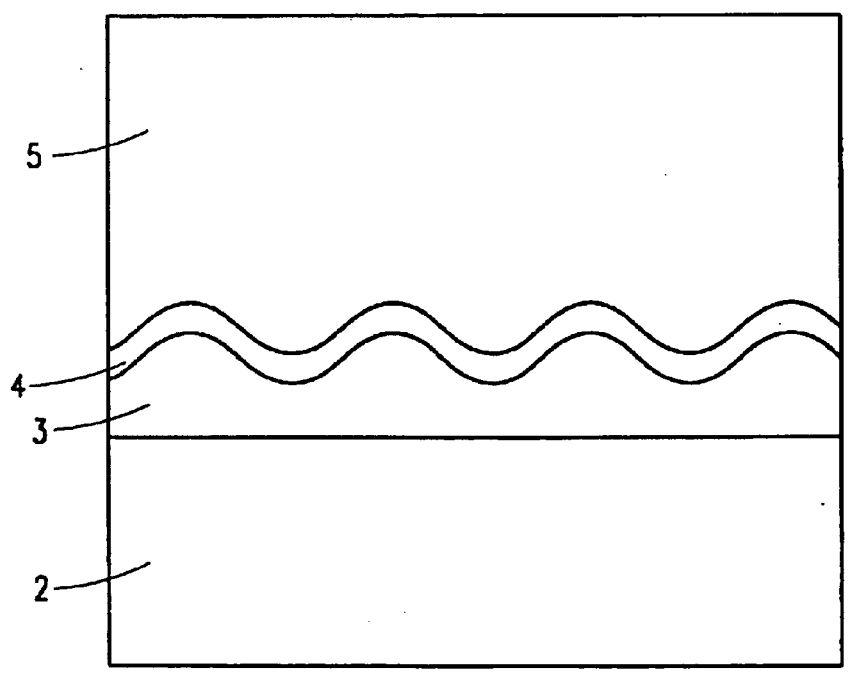

Referring to FIGS. 1A and 1B, there is shown a diffraction grating 1 according to embodiments of the present invention. Diffraction grating 1 is utilized in performing wavelength division multiplexing and demultiplexing operations, as described in greater detail below. Diffraction grating 1 may be a reflective grating so that optical and/or light rays are reflected or diffracted therefrom. Diffraction grating 1 may include a substrate 2 over which the diffractive surface of diffraction grating 1 is formed. Substrate 2 may be constructed from a number of different substances. For example, substrate 2 may be a glass compound. As shown in FIGS. 1A and 1B, substrate 2 may have a substantially planar shape. It is understood, however, that substrate 2 may alternatively include a substantially curved or concave surface (not shown) over which a diffraction grating surface is formed.

Diffraction grating 1 may further include a grating layer 3 which is formed over and/or bonded to a surface of substrate 2. An exposed surface of grating layer 3 may have a grating profile. The grating profile of grating layer 3 may be formed a number of different ways, including the utilization of ruling or holographic techniques, as is known in the art. The particular grating profiles and corresponding characteristics of grating layer 3 according to the embodiments of the present invention will be described in greater detail below.

A reflective layer 4 is formed over and/or bonded to the exposed surface of grating layer 3. Reflective layer 4 substantially forms the particular grating profile of grating layer 3. Reflective layer 4 may be a metal composition, such as gold, aluminum or silver.

An optically transmissive material or coating 5 may be disposed over or adjacent reflective layer 4. Material 5 is utilized to increase the reflectivity of diffraction grating 1. Material 5 is shown in FIG. 1A as being formed directly over reflective material 4. It is understood, however, that an additional layer (not shown), such as a bonding agent having a different index of refraction relative to material 5, may be disposed between material 5 and reflective layer 4.

It is understood that diffraction grating 1 may include additional or fewer layers than described above. For example, a surface of substrate 2 may be worked so as to form a grating profile thereon, and reflective layer 4 bonded to or formed directly on substrate 2. Alternatively, a thickness of reflective layer 4 may be sufficiently dimensioned so that a surface of reflective layer 4 may be worked to form a grating profile thereon, thereby rendering substrate 2 and grating layer 3 unnecessary. Diffraction grating 1, however, will be presented as a three layer diffraction grating for exemplary purposes.

In accordance with the embodiments of the present invention, the grating profile of diffraction grating 1 is characterized to provide enhanced optical communication. The enhanced optical communication performance of diffraction grating 1 is based upon a certain combination of parameters which define the grating profile of diffraction grating 1. As shown in FIG. 1A and in accordance with an embodiment "A" of the present invention, diffraction grating 1 is a blazed grating type. The blaze angle of diffraction grating 1 is between about twenty-seven (27) and about thirty-nine (39) degrees. The number of grooves g per millimeter of diffraction grating 1 may be generally defined by the equation $$(500 \pm 110) * n,$$

where n is the index of refraction of material 5. The number of grooves per millimeter may be more particularly defined between: about 700 and about 800 when the index of refraction n of material 5 is between about 1.44 and about 1.64 and the blaze angle is between about 27 and 32 degrees; between about 850 and 950 when the index of refraction n of material 5 is between about 1.44 and IC about 1.64 and the blaze angle is between about 31 and 34 degrees; and between about 950 and 1050 when the index of refraction n of material 5 is between about 1.44 and about 1.64 and the blaze angle is between about 34 and 39 degrees. In addition, the diffraction order utilized with embodiment A of diffraction grating 1 is the first order. The particular parameter values for embodiment A of diffraction 10 are summarized below in the following Table.

TABLE

DIFFRACTION GRATING PARAMETERS

| Grating Type | Reflection Surface | Grooves per Millimeter | Groove Depth (nm) | Index of refraction of immersed grating medium (typical) | blaze angle (degs) | diff. order |
|---|---|---|---|---|---|---|
| A | blazed | aluminum or gold | 750 ± 50 | — | 1.44–1.64 | 27–32 | 1 |
| | | | 900 ± 50 | | 1.44–1.64 | 31–34 | |
| | | | 1000 ± 50 | | 1.44–1.64 | 34–39 | |
| | | | (500 ± 110)n | | | | |

TABLE-continued

DIFFRACTION GRATING PARAMETERS

| Grating Type | Reflection Surface | Grooves per Millimeter | Groove Depth (nm) | Index of refraction of immersed grating medium (typical) | blaze angle (degs) | diff. order |
|---|---|---|---|---|---|---|
| B sinusoidal | aluminum or gold | 750 ± 50 (500 ± 110)n | 420–470 (685 ± 40)/n | 1.44–1.64 | — | 1 |
| C blazed | aluminum or gold | 300 ± 40 (200 ± 40)n | — | 1.44–1.64 | 37–40 | 4 |
| D blazed | aluminum or gold | 600 ± 40 (450 ± 40)n | — | 1.44–1.64 | 41–44 | 2 |
| E blazed | aluminum or gold | 200 ± 20 (200 ± 20)n | — | 1.0 (air) | 68–76 | 5 |
| F blazed | aluminum or gold | 250 ± 30 (250 ± 30)n | — | 1.0 (air) | 50–56 | 4 |

Figure 2:
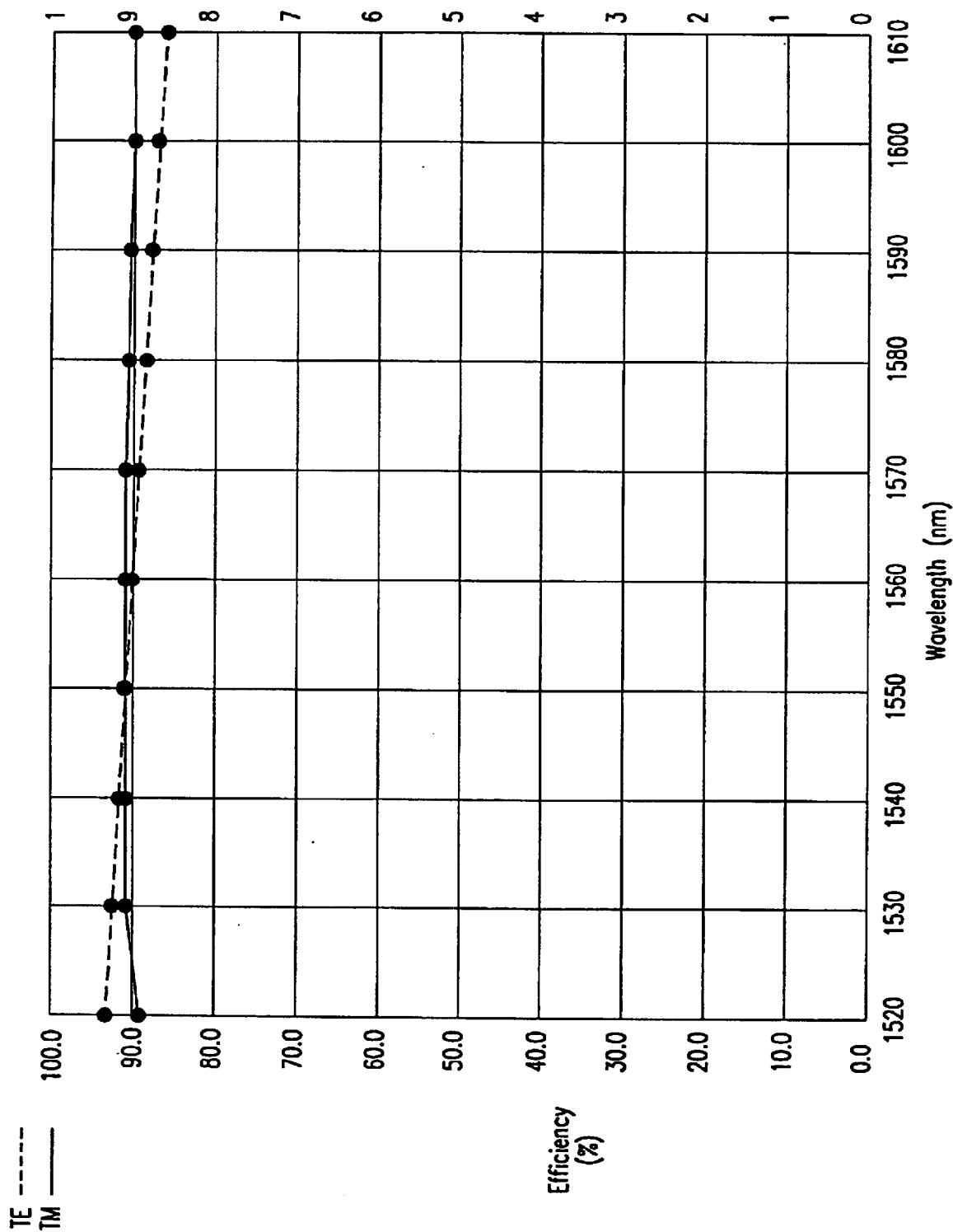
FIGS. 2–7 are graphs showing the efficiencies of the various diffraction gratings according to embodiments of the present invention.

FIG. 2 illustrates the resulting performance of embodiment A of diffraction grating 1 having the grating parameter values described above, based upon receiving an apolarized optical signal as an input. As can be seen, the efficiency of both the transverse electric polarization state TE and the transverse magnetic polarization state TM exceed 80% (the PDL being as low as 0.25 dB) over both the C-band and L-band wavelength ranges. Further, because the efficiencies of transverse electric polarization state TE and transverse magnetic polarization state TM are substantially the same across the C-band wavelength range and the L-band wavelength range, diffraction grating 1 diffracts substantially apolarized optic rays in response to the apolarized input optical signal. Consequently, diffraction grating 1 is substantially polarization insensitive across the C-band wavelength range (about 1520 nm to about 1566 nm) and the L-band wavelength range (about 1560 nm to about 1610 nm).

Still further, the cross-over point for the efficiency of the transverse electric polarization state TE and the efficiency of the transverse magnetic polarization state TM occurs in the C-band wavelength range, and particularly in the upper half thereof. The high efficiency combined with the location of the efficiency cross-over location result in diffraction grating 1 providing enhanced optical performance in both the C-band and L-band wavelength ranges.

In accordance with another embodiment of the present diffraction grating invention, FIG. 1B shows the profile of embodiment "B" of a diffraction grating 1 of the sinusoidal grating type. The groove depth d of diffraction grating 1 of embodiment B may be generally defined by the equation (685±40)/n, where n is the index of refraction of material 5. The groove depth may be more particularly defined between about 420 nm and about 470 nm when material 5 has an index of refraction between about 1.44 and about 1.64. The number of grooves g per millimeter of diffraction grating 1 may be generally defined by the equation (500±110)*n, and more particularly defined between about 700 and about 800 when material 5 has an index of refraction between about 1.44 and about 1.64. In addition, the diffraction order utilized with embodiment B of diffraction grating 1 is the first order. The particular parameter values for embodiment B of diffraction 10 are summarized in the Table.

Figure 3:
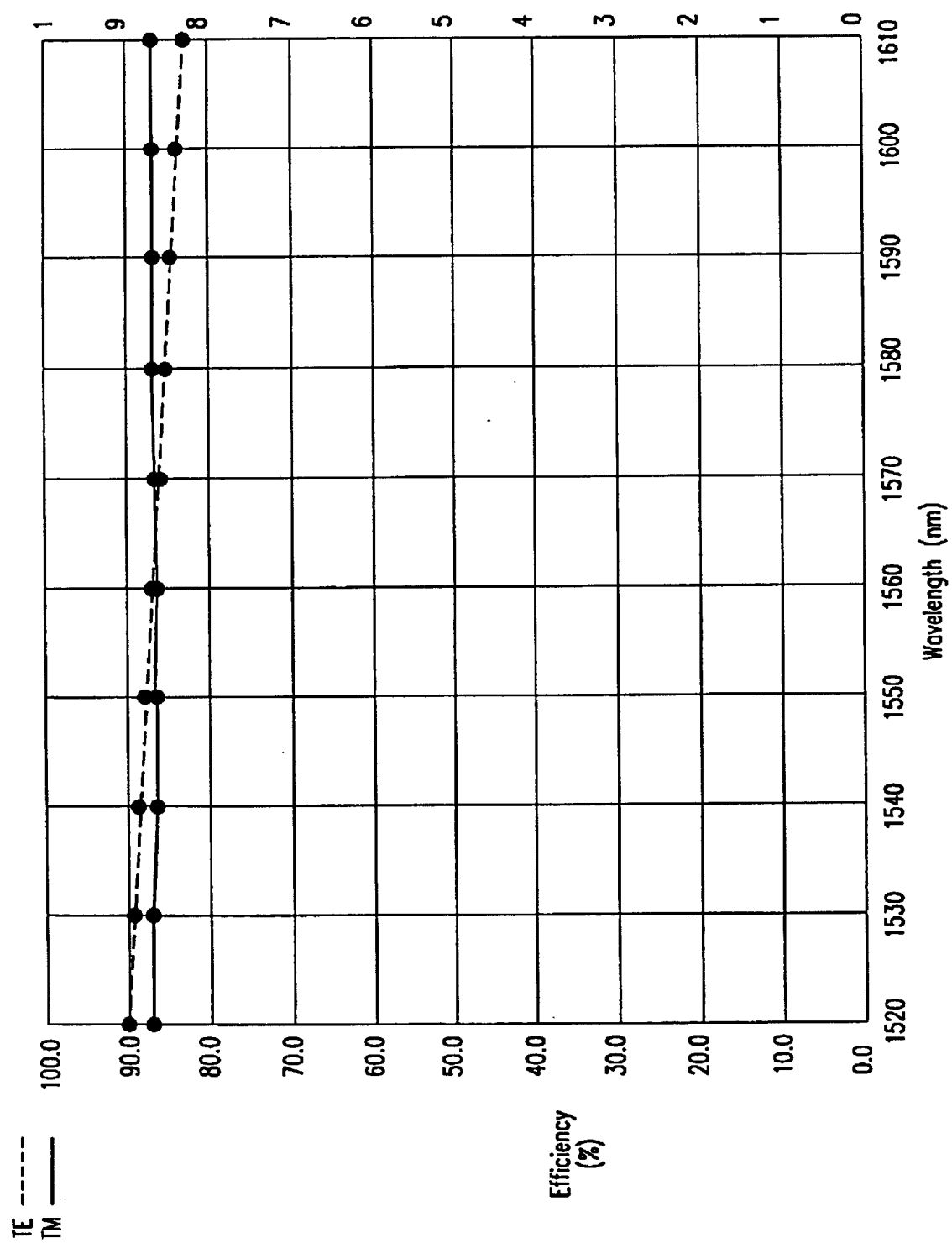

FIG. 3 illustrates the resulting performance of embodiment B of diffraction grating 1 having the grating parameter values described above, based upon receiving an apolarized optical signal as an input. As can be seen, the efficiency of both the transverse electric polarization state TE and the transverse magnetic polarization state TM exceed 80% over the C-band and L-band wavelength ranges. Further, because the efficiencies of transverse electric polarization state TE and transverse magnetic polarization state TM are substantially the same and/or closely follow each other across the C-band and L-band wavelength ranges, diffraction grating 1 diffracts substantially apolarized optic rays in response to the apolarized input optical signal. Consequently, diffraction grating 1 is substantially polarization insensitive across the C-band and L-band wavelength ranges.

Still further, the cross-over point for the efficiency of the transverse electric polarization state TE and the efficiency of the transverse magnetic polarization state TM occurs in the C-band wavelength range, and particularly in the upper end thereof. The high efficiency combined with the location of the efficiency cross-over point result in diffraction grating 1 providing enhanced optical performance in both the C-band wavelength range and the L-band wavelength ranges.

In accordance with another embodiment of the present diffraction grating invention, FIG. 1A illustrates the profile of embodiment "C" of a diffraction grating 1 of the blazed grating type. The blaze angle of diffraction grating 1 is between about thirty-seven (37) and about forty (40) degrees. The number of grooves G per millimeter of diffraction grating 1 may be generally defined by the equation (200±40)*n, where n is the index of refraction of material 5. More specifically, the number of grooves may be between about 260 and about 340 when material 5 has an index of refraction n between about 1.44 and about 1.64. In addition, the diffraction order utilized with embodiment C of diffraction grating 1 is the fourth order. The particular parameter values for embodiment C of diffraction 10 are summarized the Table.

Figure 4:
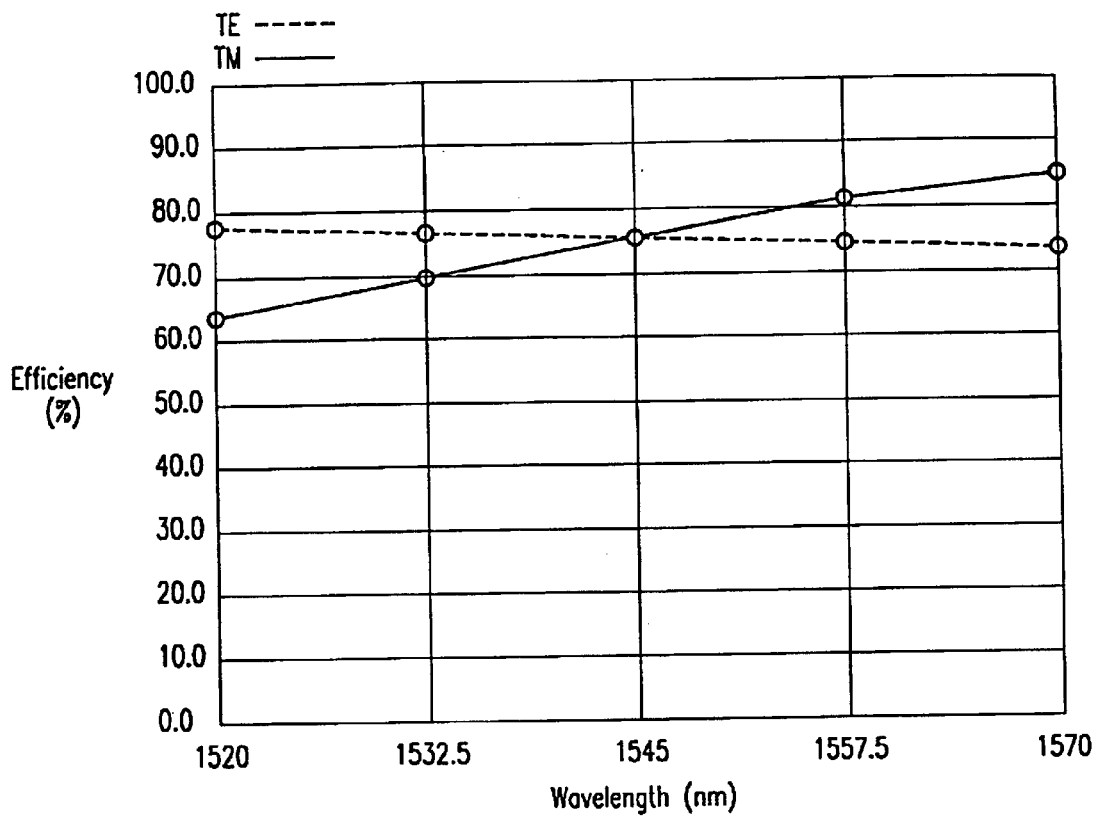

FIG. 4 illustrates the resulting performance of embodiment C of diffraction grating 1 having the grating parameter values described above, based upon receiving an apolarized optical signal as an input. As can be seen, the efficiency of both the transverse electric polarization state TE and the transverse magnetic polarization state TM exceed 60% over the C-band wavelength range. Further, because the efficiencies of transverse electric polarization state TE and transverse magnetic polarization state TM somewhat closely follow each other across the C-band wavelength range, embodiment C of diffraction grating 1 diffracts substantially apolarized optic rays in response to the apolarized input optical signal.

Still further, the cross-over point for the efficiency of the transverse electric polarization state TE and the efficiency of the transverse magnetic polarization state TM occurs in the C-band wavelength range, and particularly around the midpoint thereof. The high efficiency combined with the location of the efficiency cross-over point result in diffraction grating 1 providing enhanced optical performance in the C-band wavelength range.

In accordance with another embodiment of the present diffraction grating invention, FIG. 3A shows the profile of embodiment "D" of a diffraction grating 1 of the blazed grating type. The blaze angle of embodiment D of diffraction grating 1 is between about forty-one (41) and about forty-four (44) degrees. The number of grooves G per millimeter of diffraction grating 1 may be generally defined by the equation $$(450 \pm 40)*n,$$

where n is the index of refraction of material 5. More specifically, the number of grooves may be between about 560 and about 640 when material 5 has an index of refraction n between about 1.44 and about 1.64. In addition, the diffraction order utilized with embodiment D of diffraction grating 1 is the second order. The particular parameter values for embodiment D of diffraction 10 are summarized in the Table.

Figure 5:
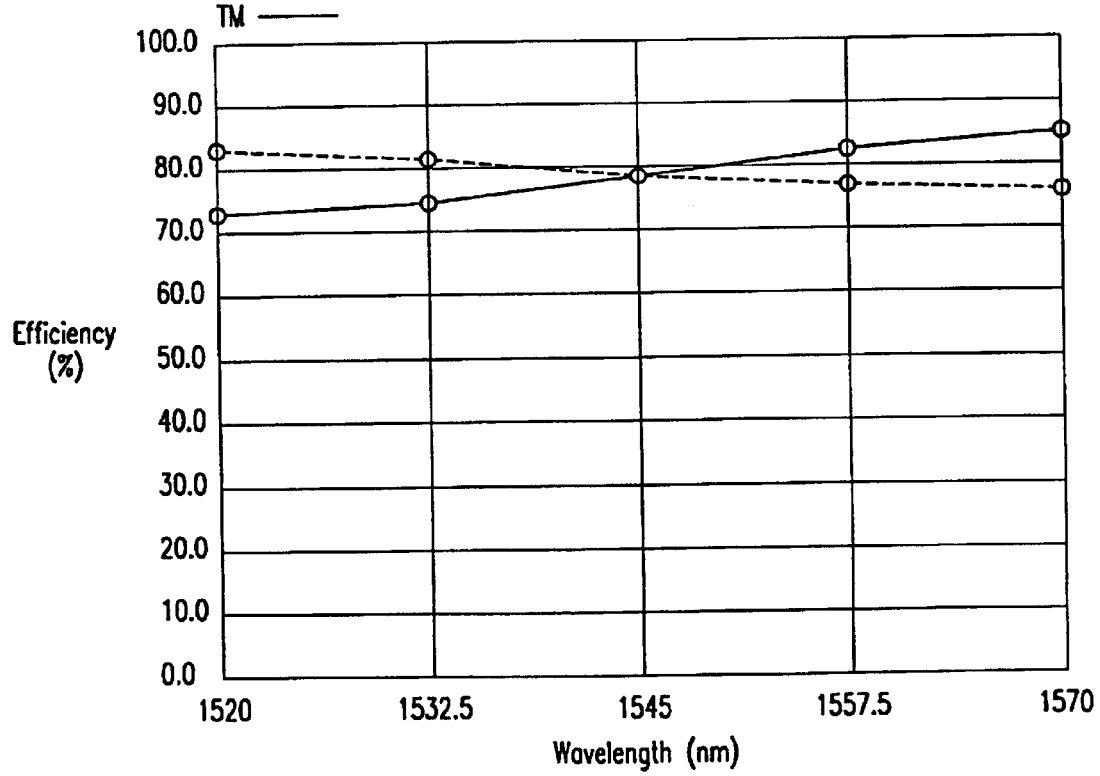

FIG. 5 illustrates the resulting performance of embodiment D of diffraction grating 1 having the grating parameter values described above, based upon receiving an apolarized optical signal as an input. As can be seen, the efficiency of both the transverse electric polarization state TE and the transverse magnetic polarization state TM exceed 70% over the C-band wavelength range. Further, because the efficiencies of transverse electric polarization state TE and transverse magnetic polarization state TM somewhat closely follow each other across the C-band wavelength range embodiment D of diffraction grating 1 diffracts substantially apolarized optic rays in the C-band wavelength range in response to the apolarized input optical signal.

In accordance with another embodiment of the present diffraction grating invention, FIG. 3A shows the profile of embodiment "E" of a diffraction grating 1 of the blazed grating type. The blaze angle of embodiment E of diffraction grating 1 is between about sixty-eight (68) and about seventy-six (76) degrees. The number of grooves G per millimeter of embodiment E of diffraction grating 1 may be generally defined by the equation $$(200 \pm 20)*n,$$

where n is the index of refraction of material 5. More specifically, the number of grooves may be between about 180 and about 220 when material 5 is air or otherwise has an index of refraction of about 1.0. In addition, the diffraction order utilized with embodiment E of diffraction grating 1 is the fifth order. The particular parameters for embodiment E of diffraction 10 are summarized in the Table.

Figure 6:
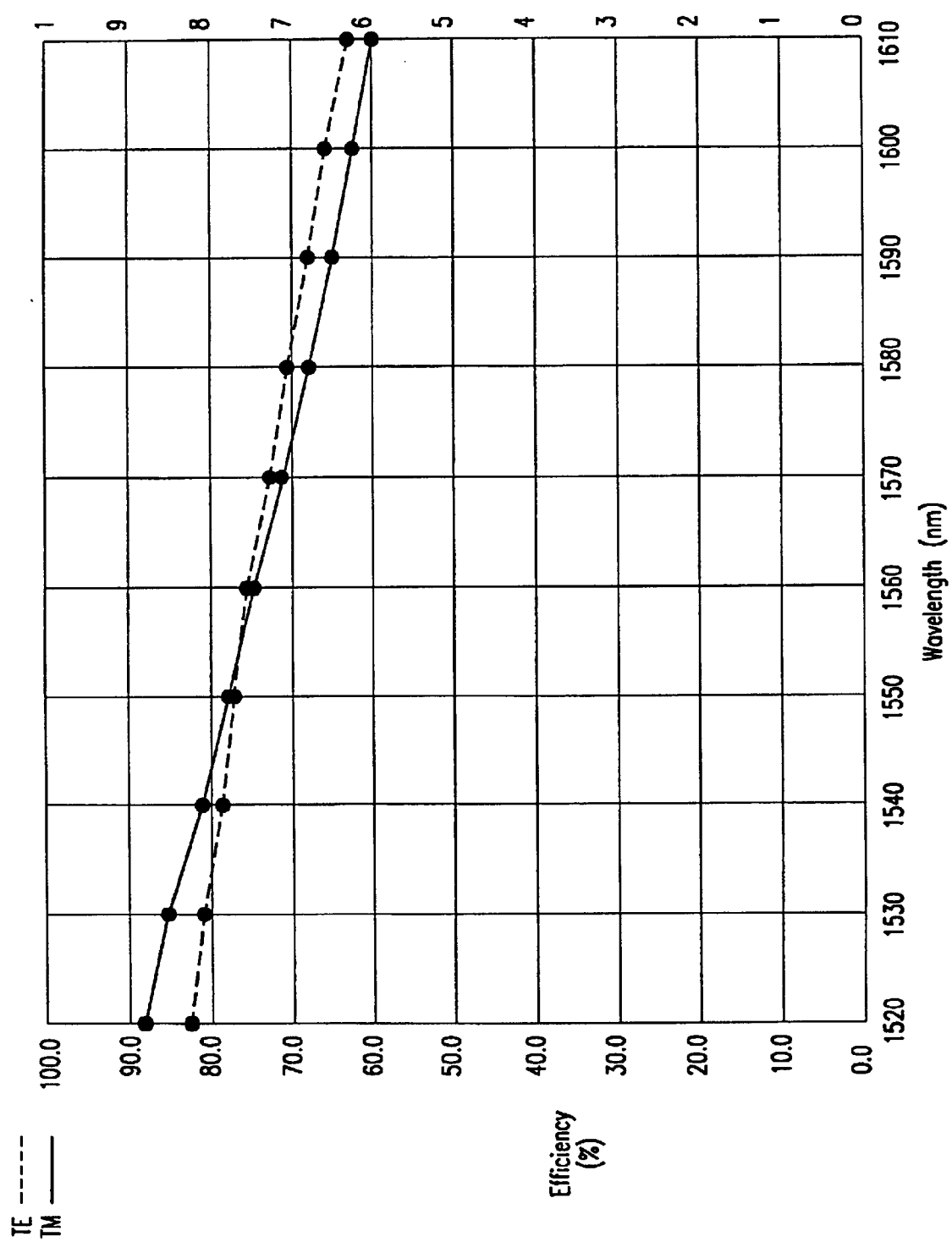

FIG. 6 illustrates the resulting performance of embodiment E of diffraction grating 1 having the grating parameter values described above, based upon receiving an apolarized optical signal as an input. As can be seen, the efficiency of both the transverse electric polarization state TE and the transverse magnetic polarization state TM exceed 70% over the C-band wavelength range, and exceed 60% over the L-band wavelength range. Further, because the efficiencies of transverse electric polarization state TE and transverse magnetic polarization state TM somewhat closely follow each other across the C-band and L-band wavelength ranges, embodiment E of diffraction grating 1 diffracts substantially apolarized optic rays across the C-band and L-band wavelength ranges in response to the apolarized input optical signal. Still further, the cross-over point for the efficiency of the transverse electric polarization state TE and the efficiency of the transverse magnetic polarization state TM occurs in the C-band wavelength range, and particularly around the midpoint thereof. The high efficiency combined with the location of the efficiency cross-over point result in embodiment E of diffraction grating 1 providing enhanced optical performance in both the C-band wavelength range and the L-band wavelength range.

In accordance with another embodiment of the present diffraction grating invention, FIG. 3A shows the profile of embodiment b° F. of a diffraction grating 1 of the blazed grating type. The blaze angle of embodiment F of diffraction grating 1 is between about fifty (50) and about fifty-six (56) degrees. The number of grooves G per millimeter of embodiment F of diffraction grating 1 may be generally defined by the equation $$(250 \pm 30)*n,$$

where n is the index of refraction of material 5. More specifically, the number of grooves may be between about 220 and about 280 when material 5 is air or otherwise has an index of refraction of about 1.0. In addition, the diffraction order utilized with embodiment E of diffraction grating 1 is the fourth order. The particular parameters for embodiment E of diffraction 10 are summarized in the Table.

Figure 7:
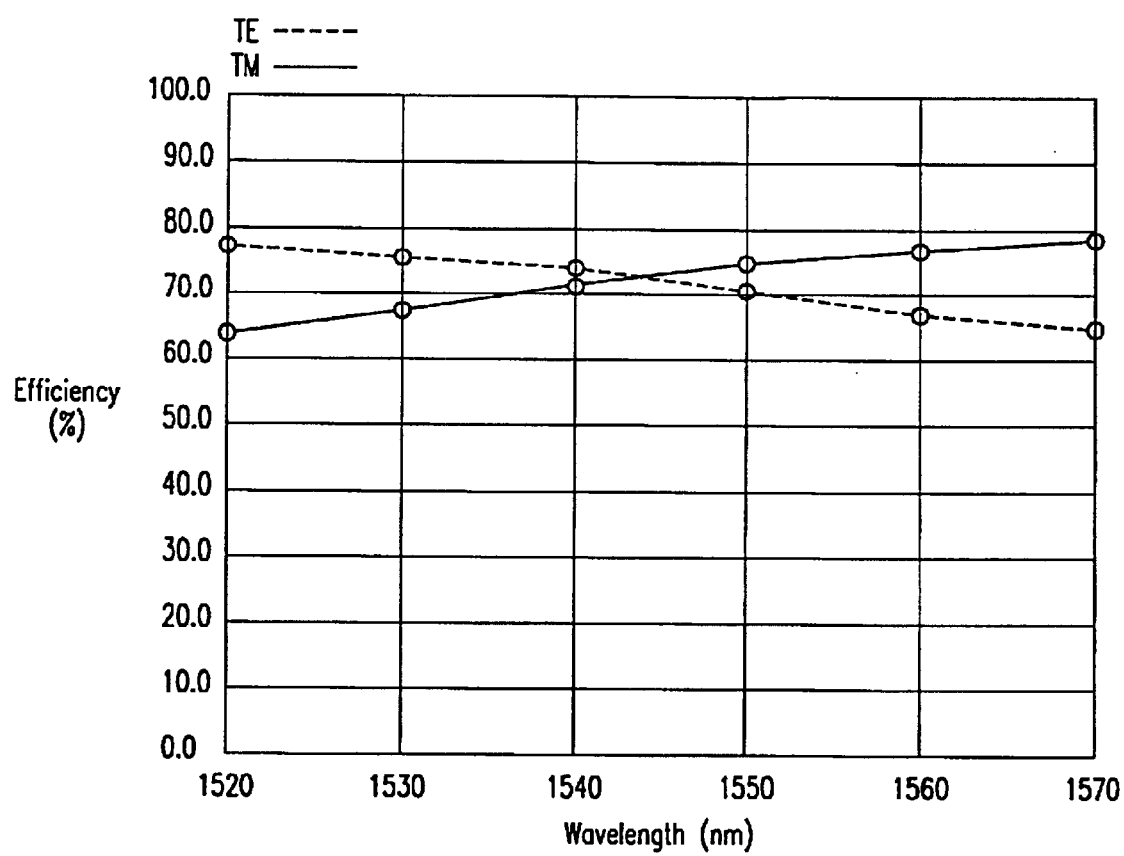

FIG. 7 illustrates the resulting performance of embodiment F of diffraction grating 1 having the grating parameter values described above, based upon receiving an apolarized optical signal as an input. As can be seen, the efficiency of both the transverse electric polarization state TE and the transverse magnetic polarization state TM exceed 60% over the C-band wavelength range. Further, because the efficiencies of transverse electric polarization state TE and transverse magnetic polarization state TM somewhat closely follow each other across the C-band wavelength range, embodiment F of diffraction grating 1 diffracts substantially apolarized optic rays in response to receiving an apolarized input optical signal. Still further, the cross-over point for the efficiency of the transverse electric polarization state TE and the efficiency for the transverse magnetic polarization state TM occurs in the C-band wavelength range, and particularly around the midpoint thereof. The high efficiency combined with the location of the efficiency cross-over point result in embodiment F of diffraction grating 1 providing enhanced optical performance in the C-band wavelength range.

Figure 8:
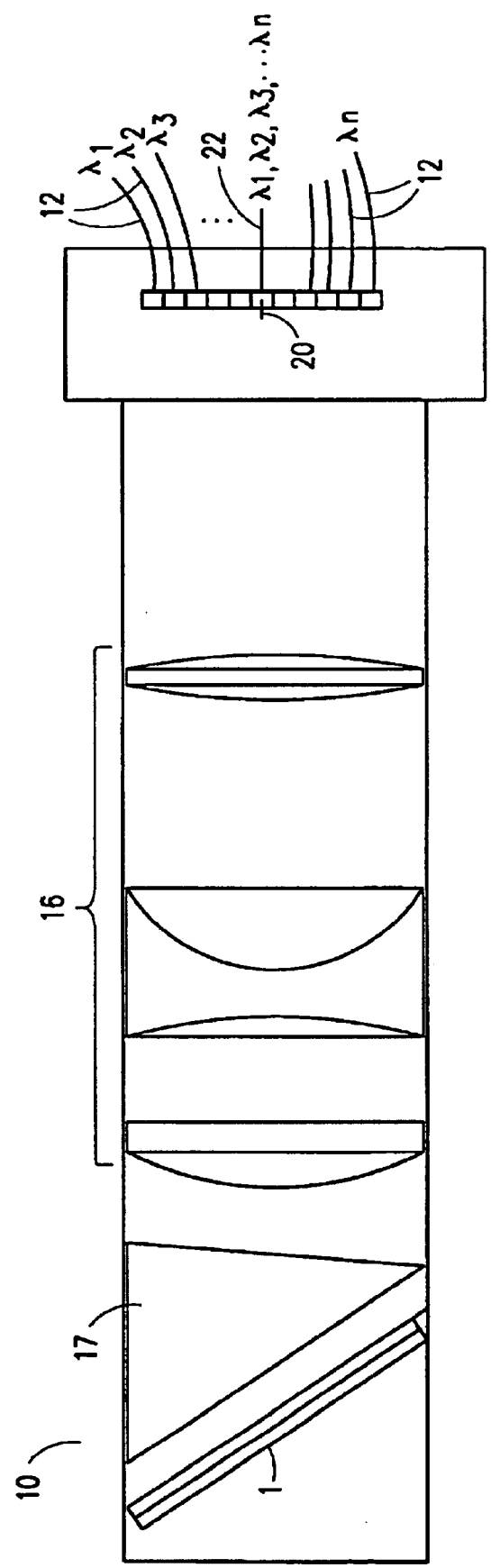
FIG. 8 is a side elevational view of a wave division multiplexing/demultiplexing device according to an embodiment of the present invention.

Referring to FIG. 8, there is shown a side view of a preferred embodiment of a wavelength division multiplexing/demultiplexing (WDM) device 10 in accordance with the present invention. The WDM device 10 comprises a plurality of first optical fiber lines or carriers 12, a corresponding plurality of first coupling components 14, a collimating/focusing lens 16 assembly, a prism 17, reflective diffraction grating 1, a second coupling component 20, and a corresponding second optical fiber line or carrier 22. All of the above-identified components of the WDM device 10 are disposed along an optical axis X—X of the WDM 10, as will be described in more detail below.

End portions of the plurality of first optical fiber lines or carriers 12 are grouped into a one-dimensional fiber array (i.e., a 1×4 array) by the first coupling components 14, while an end portion of the single second optical fiber 22 is secured to the output fiber coupling component 20. Both the first coupling components 14 and the second coupling component 20 are used for purposes of optical fiber securement, ease of optical fiber handling and precision optical fiber placement within WDM device 10. First and second coupling components may be, for example, a silicon V-groove assembly.

Figure 9A:
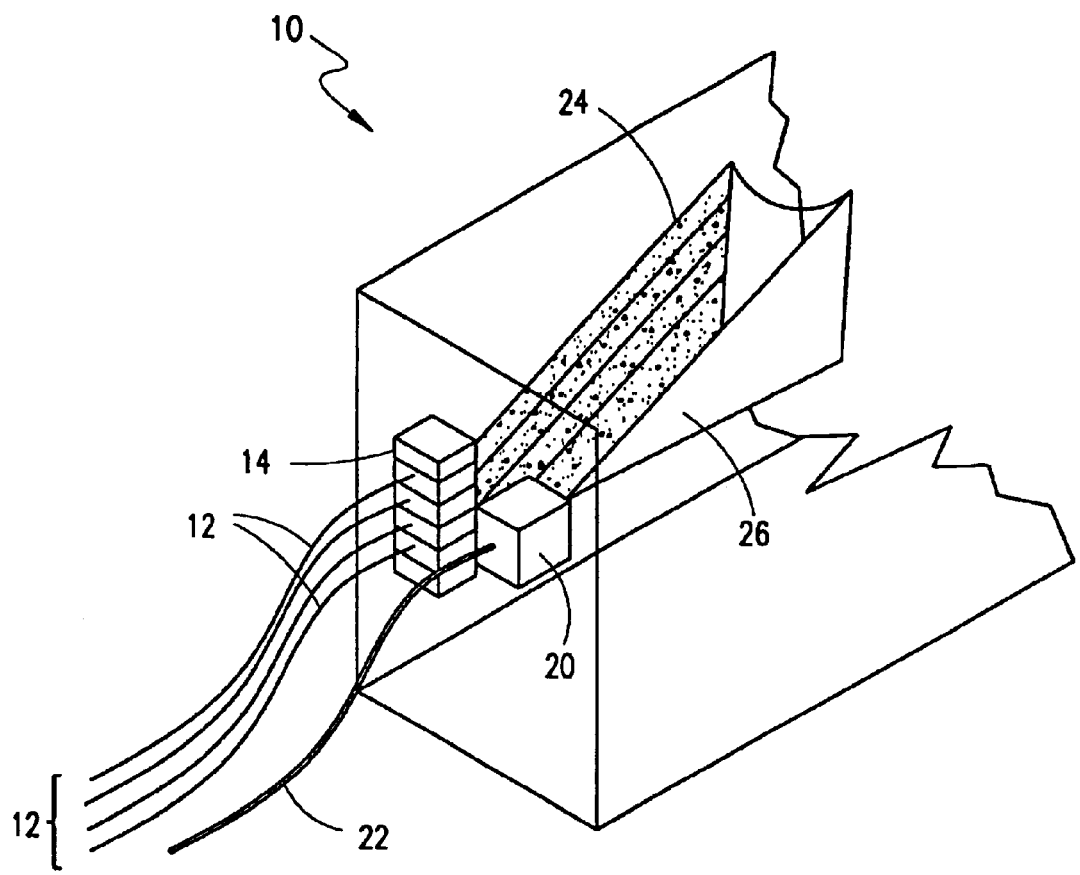
FIG. 9A is a perspective view of a portion of the wave division multiplexing/demultiplexing device of FIG. 8.

Referring to FIG. 9A, there is shown a perspective end view of a portion of the WDM device 10 revealing how the plurality of first optical fibers 12 are grouped into the one-dimensional fiber array by the first coupling components 14, and how the single second optical fiber 22 is secured to the second coupling component 20.

Figure 9B:
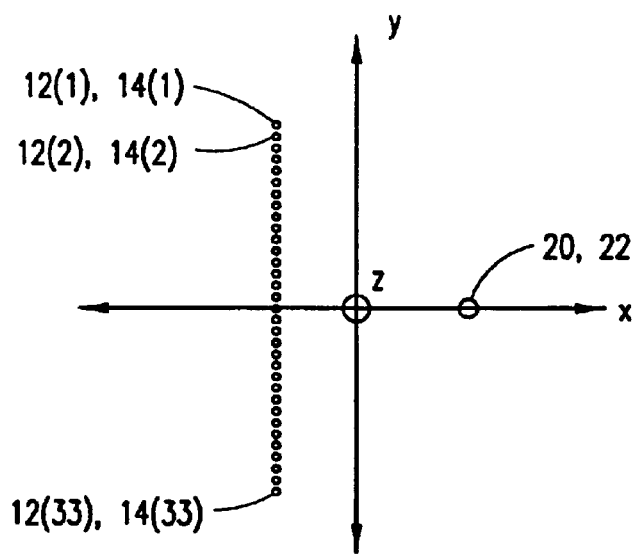
FIG. 9B is an end view of the portion of the wave division multiplexing/demultiplexing device of FIG. 8.

As shown in FIG. 9B, the first coupling components 14 and the second coupling component 20 are disposed offset from, but symmetrically about, the optical axis X—X of the multiplexing device 10 so as to avoid signal interference between a polychromatic optical beam 26 appearing on or directed to second optical fiber 22 and a narrowband optical beam 24 appearing on or directed to any of the plurality of first optical fibers 12, or anywhere else. This offset spacing of the first coupling components 14 from the second coupling component 20 is determined based upon the characteristics of diffraction grating 1, the wavelengths of each of the narrowband optical beams 24, and the focusing power of lens assembly 16.

Lens assembly 16 (FIG. 8) is adapted to collimate narrowband optical beams 24 incident thereon. Lens assembly 16 has a relatively high level of transmission efficiency. The lens assembly may include a plano-convex homogeneous refractive index collimating/focusing lens assembly. Each lens in the lens assembly 16 may utilize a refraction glass material having a high index of refraction to insure efficient optic beam transmissions.

Lens assembly 16 is illustrated in the drawings as a triplet lens assembly for exemplary purposes only. It is understood that lens assembly 16 may include other lens types, lens configurations and/or lens compositions or a different number of lenses. In cases where diffraction grating 1 is concave or otherwise non-planar, the use of lens assembly 16 within WDM device 10 may be unnecessary.

Prism 17 is disposed between lens assembly 16 and diffraction grating 1. Prism 17 bends optical signals from lens assembly 16 towards diffraction grating 1. In doing so, prism 17 allows diffraction grating 1 to be angularly disposed within the housing of WDM device 10, as shown in FIG. 8. Prism 17 may be in direct contact with material 5 of diffraction grating 1, or spaced therefrom. It is understood, however, that WDM device 1 may be utilized without prism 17.

The use of diffraction grating 1 within WDM device 10 results in a high efficiency device for performing substantially polarization insensitive multiplexing/demultiplexing operations. For instance, WDM device 10, in accordance with embodiments of the present invention, may achieve a polarization dependent loss of less than approximately 1 dB, and particularly less than 0.5 dB, with an insertion loss of less than 3 dB. Due in part to the angular dispersion provided by diffraction grating 1, WDM device 10 may handle up to 49 channels with channel spacing of approximately 0.8 nm over the C-band or L-band wavelength range. Diffraction grating 1 may be used in the Littrow mode in WDM device 10. With such high efficiency performance, the present WDM device 10 may be utilized as a passive device and in a substantially passive network. By eliminating the need for active components, WDM device 10 of the embodiments of the present invention thereby reduces power and conserves energy.

It is understood that although diffraction grating 1 may be associated with and/or included in passive devices and networks, it is understood that diffraction grating 1 may be utilized in devices and networks having active components which may perform one or more of a variety of active functions, including optical amplification.

The WDM device 10 may further include a set of patterned optical component (not shown). By way of one example, each patterned optical component may be a plano-convex converging patterned optical component having a substantially convex surface on one side with a substantially patterned phase mask superimposed, and the spacing or pitch between adjacent patterned optical components may progressively increase from one end of the one-dimensional fiber array to the other. The progressively increased pitch may be a function of the diffraction equation of diffraction grating 1. The patterned optical components are discussed in greater detail in U.S. patent application Ser. No. 09/545,826, which is incorporated by reference herein in its entirety.

The operation of WDM device 10 will be described with reference to FIGS. 10A–10D. As mentioned above, WDM device 10 is capable of performing both multiplexing and demultiplexing functions. In the context of a multiplexing function, reference is made to FIGS. 10A and 10B.

In performing a multiplexing function, WDM device 10 generally receives a plurality of individual narrowband optical input signals or beams 24 at different wavelengths and combines such signals to generate a polychromatic output signal or beam 26. Each of the plurality of narrowband optical input beams 24 are transmitted along and emitted from a corresponding first optical fiber 12 into the air space between the first coupling components 14 and lens assembly 16. Within this air space, the plurality of narrowband optical input beams 24 are expanded in diameter (best seen in FIG. 9) until they become incident upon the lens assembly 16. The lens assembly 16 collimates each of the plurality of narrowband optical input beams 24 (FIG. 10A), and transmits each collimated, narrowband optical input beam 24' to the diffraction grating 1.

Referring to FIG. 10B, diffraction grating 1 operates to angularly reflect the plurality of collimated, narrowband optical input beams 24' back towards lens assembly 16, generally shown as reflected beams 24". In doing so, the diffraction grating 1 removes the angular or spatial separation of the plurality of collimated, narrowband optical input beams 24". Lens assembly 16 focuses the reflected beams 24" towards second coupling component 20. The focused reflected beams 24" become incident upon the single second optical fiber 22 and combine in a multiplexed polychromatic optical output signal 26 at second coupling component 20. The single collimated, polychromatic optical output beam 26 contains each of the unique wavelengths of the plurality of the narrowband reflected beams 24". The single multiplexed, polychromatic optical output beam 26 is then coupled into the single second optical fiber 22 for transmission therethrough.

Figure 10D:
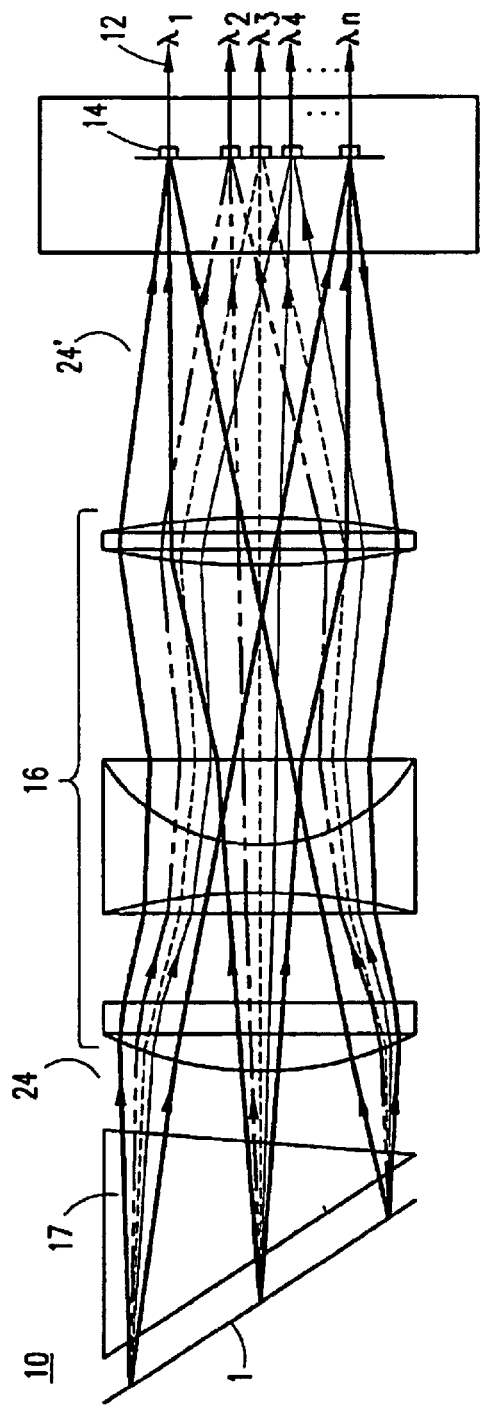
FIGS. 10A–10D illustrate multiplexing and demultiplexing functions of the wave division multiplexing/demultiplexing device of FIG. 8.
Figure 10E:
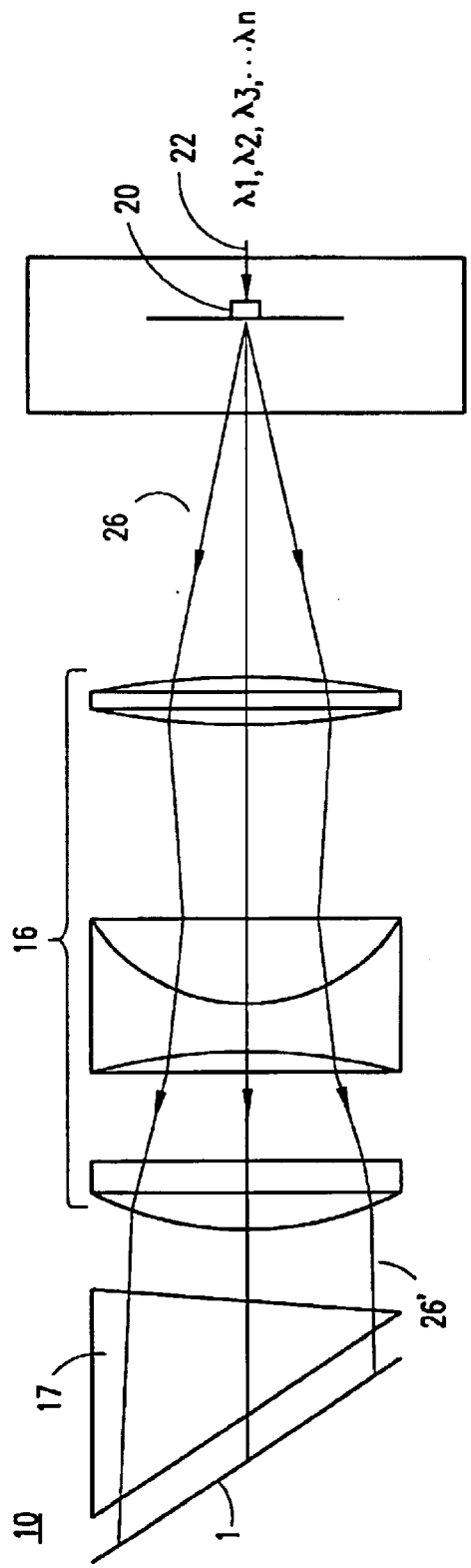

In the context of performing a demultiplexing operation, the operation of WDM device 10 will be described with reference to FIGS. 10C and 10D. In performing a demultiplexing function, WDM device 10 generally receives a single polychromatic input signal or beam 26 and generates a plurality of individual narrowband optical signals or beams 24 at different wavelengths from the single polychromatic input signal 26.

A single polychromatic optical input beam 26 is transmitted along and emitted from second optical fiber 22 into the air space between the second coupling component 20 and the lens assembly 16. Within this air space, the polychromatic optical input beam 26 is expanded in diameter (best seen in FIG. 9) until it becomes incident upon the lens assembly 16. The lens assembly 16 focuses the polychromatic optical input beam 26 towards diffraction grating 1 as polychromatic optical beam 26' (FIG. 10C).

As stated above, diffraction grating 1 operates to angularly diffract the polychromatic optical beam 26' into a plurality of narrowband optical beams 24, with each reflected narrowband beam 24 being diffracted at a distinct angle, relative to diffraction grating 1, by an amount that is dependent upon the wavelength of the reflected narrowband optical beam 24. As shown in FIG. 10D, the diffraction grating 1 reflects the narrowband optical signals 24 back towards the lens assembly 16. The lens assembly 16 collimates the plurality of narrowband optical input beams 24, and then transmits each collimated, narrowband optical beam 24' to the corresponding first coupling component 14 and corresponding first optical fiber 12. Each narrowband optical beam 24' becomes incident upon a corresponding first optical fiber 12. At this point, the narrowband optical signals 24' are then coupled to the first optical fibers 12 for transmission therethrough.

Figure 11:
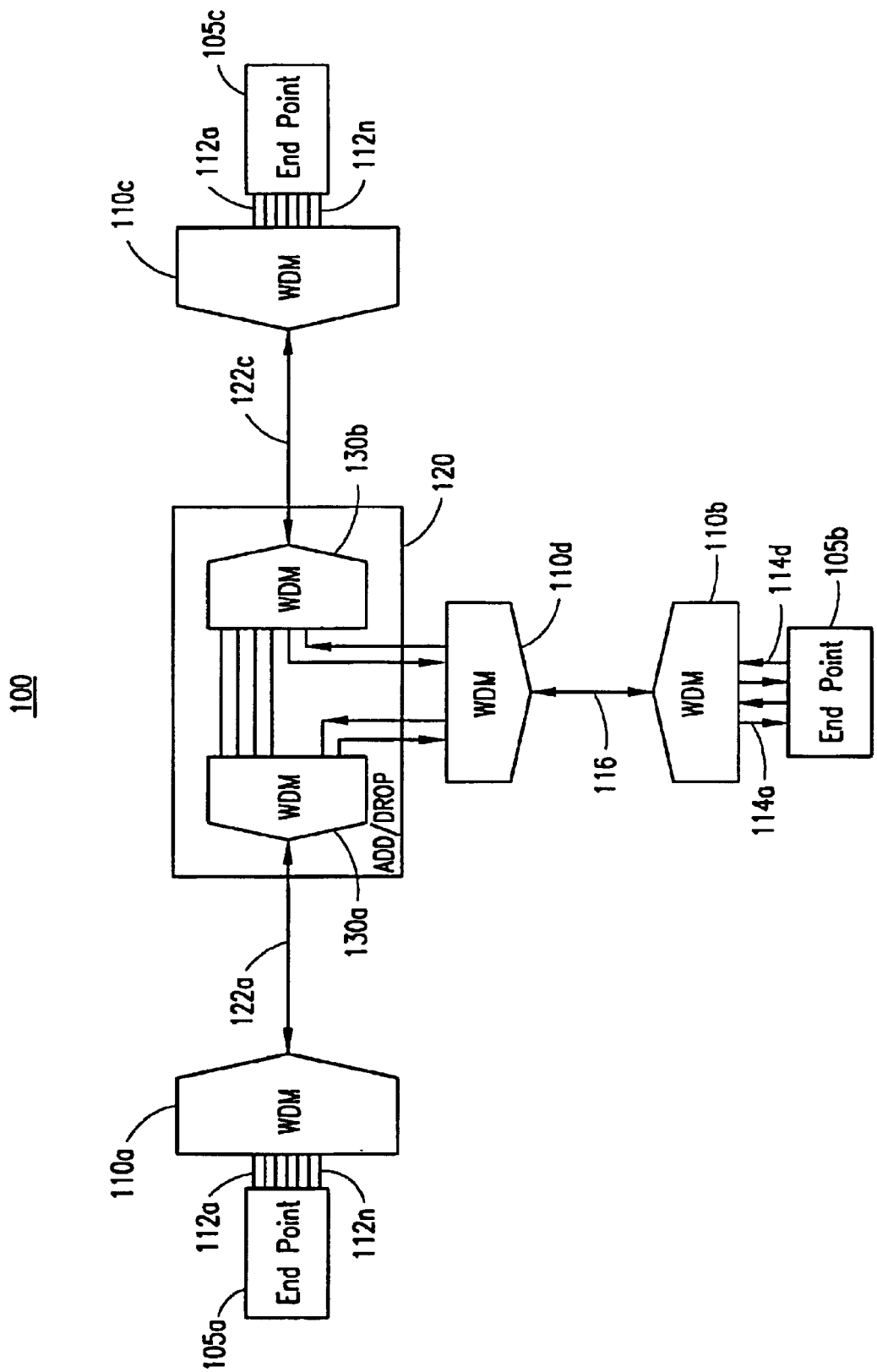
FIG. 11 is a block diagram of an optical communications system according to an embodiment of the present invention.
Figure 12A:
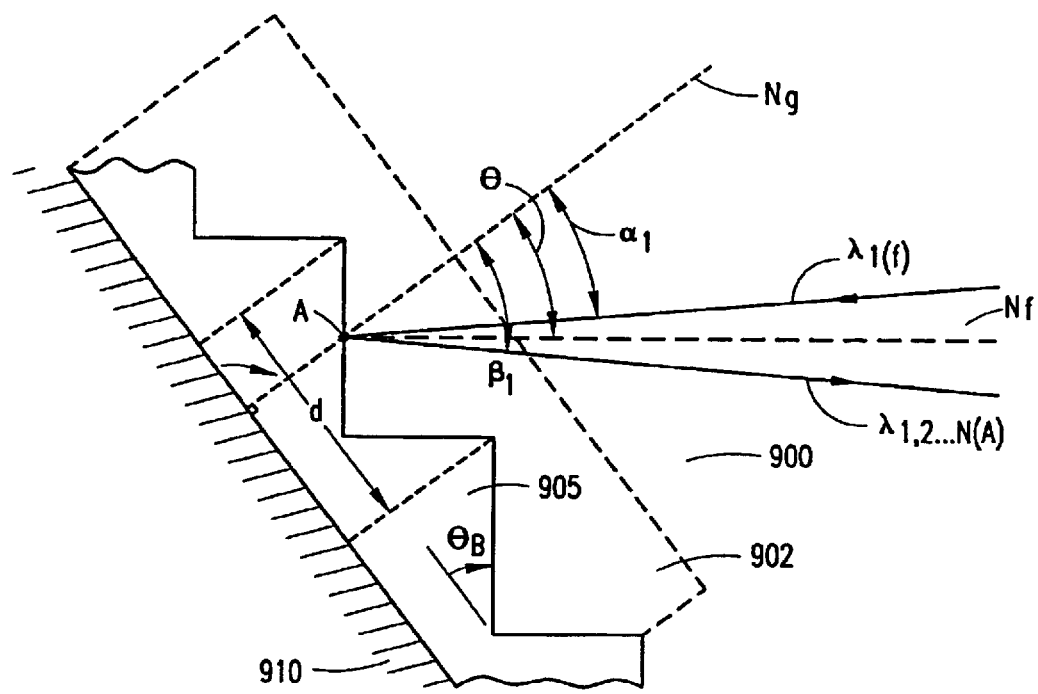
FIGS. 12A–12C illustrate the general concepts relating to diffraction gratings.
Figure 12B:
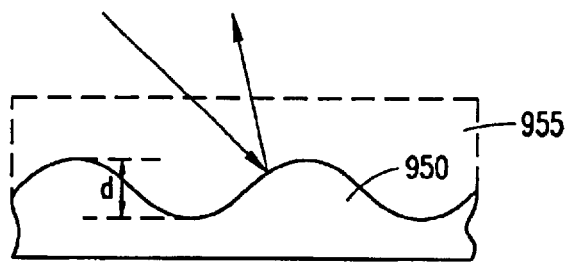
Figure 12C:
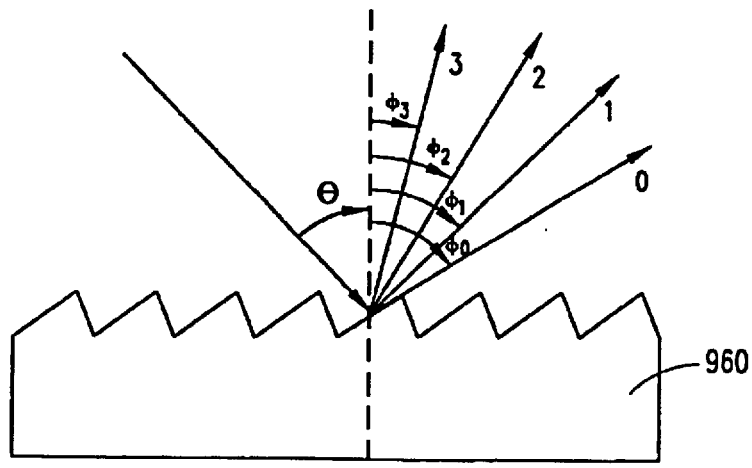

FIG. 11 is a block diagram of a fiber optic network 100 in accordance with an embodiment of the present invention. The fiber optic network 100 provides optical communication between end points 105a, 105b, and 105c. Each end point 105a, 105b, and 105c is coupled to a WDM 110a, 110b, and 110c, respectively, either optically or electrically. In the case of an optical coupling, each end point 105a and 105c communicates a multiple number of narrowband optical signals via fiber optic lines or carriers 112a–112n to the associated WDM 110a–110c, respectively. The end point 105b communicates a multiple number of narrowband optical signals via fiber optic lines or carriers 114a–114d to/from WDM 110b, which multiplexes the narrowband optical signals 114b, 114d to WDM 110d along fiber optic line or carrier 116.

The WDMs 110a and 110c are coupled via a wavelength add/drop device 120 between the fiber optic lines 122a and 122c, respectively. The wavelength add/drop device 120 is, in general terms, a simple form of a wavelength router with two input/output (I/O) ports and an additional third port wherein narrowband optical signals are added to/dropped from the incoming polychromatic optical signal appearing at either I/O port. Within the wavelength add/drop device 120, a pair of WDMs 130a–130b are utilized to separate a received polychromatic optical signal into a plurality of narrowband optical signals and communicate one or more of the narrowband optical signals to end point 105b, via the WDM 110d.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A diffraction grating, comprising:

a reflective material having a blazed surface with a blaze angle between about 27 degrees and about 39 degrees; and an optically transmissive material disposed adjacent the reflective material and having an index of refraction (n), wherein the blazed surface of the reflective material has approximately (500±110)*n number of grooves per millimeter such that the diffraction grating has an efficiency of at least 80% for all polarization states over at least one of the C-band and L-band wavelength ranges.

2. The diffraction grating of claim 1, wherein:

the number of grooves per millimeter for the reflective material is between about 710 and about 790;

the index of refraction of the optically transmissive material is between about 1.44 and about 1.64; and the blaze angle is between about 27 and about 32 degrees.

3. The diffraction grating of claim 1, wherein:

the diffraction order associated with the lowest loss is the first order.

4. The diffraction grating of claim 1, wherein:

the number of grooves per millimeter for the reflective material is between about 850 and about 950;

the index of refraction of the optically transmissive material is between about 1.44 and about 1.64; and the blaze angle is between about 31 and about 34 degrees.

5. The diffraction grating of claim 1, further comprising:

the number of grooves per millimeter for the reflective material is between about 950 and about 1050;

the index of refraction of the optically transmissive material is between about 1.44 and about 1.64; and the blaze angle is between about 34 and about 39 degrees.

6. A diffraction grating, comprising:

a reflective material having a blazed surface with a blaze angle between about 37 degrees and about 40 degrees; and an optically transmissive material disposed adjacent the reflective material and having an index of refraction (n), wherein the blazed surface of the reflective material has approximately (200±40)*n number of grooves per millimeter such that the diffraction grating has an efficiency of at least 60% for all polarization states over the C-band wavelength range.

7. The diffraction grating of claim 6, wherein:

the number of grooves per millimeter for the reflective material is between about 260 and about 340; and the index of refraction of the optically transmissive material is between about 1.44 and about 1.64.

8. The diffraction grating of claim 6, wherein:

the diffraction order associated with the lowest loss is the fourth order.

9. The diffraction grating of claim 6, wherein:

the reflective material is at least one of the following: gold material, aluminum material and silver material.

10. The diffraction grating of claim 6, further comprising:

a substantially planar substrate on which the reflective material is formed.

11. A diffraction grating, comprising:

a reflective material having a blazed surface of grooves with a blaze angle between about 41 degrees and about 44 degrees; and an optically transmissive material disposed adjacent the reflective material and having an index of refraction (n), wherein the blazed surface of the reflective material has approximately (450±40)*n number of grooves per millimeter such that the diffraction grating has an efficiency of at least 70% for all polarization states over the C-band wavelength range.

12. The diffraction grating of claim 11, wherein:

the number of grooves per millimeter for the reflective material is between about 560 and about 640; and the index of refraction of the optically transmissive material is between about 1.44 and about 1.64.

13. The diffraction grating of claim 11, wherein:

the diffraction order associated with the lowest loss is the second order.

14. The diffraction grating of claim 11, wherein:

the reflective material is at least one of the following: gold material, aluminum material and silver material.

15. The diffraction grating of claim 11, further comprising:

a substantially planar substrate on which the reflective material is formed.

16. A diffraction grating, comprising:

a reflective material having a blazed surface with a blaze angle between about 68 degrees and about 76 degrees; and an optically transmissive material disposed adjacent the reflective material and having an index of refraction (n), wherein the blazed surface of the reflective material has approximately $(200\pm20)*n$ number of grooves per millimeter such that the diffraction grating has an efficiency of at least 60% for all polarization states over at least one of the C-band and L-band wavelength ranges.

17. The diffraction grating of claim 16, wherein:

the number of grooves per millimeter for the reflective material is between about 180 and about 220; and the index of refraction of the optically transmissive material is approximately 1.0.

18. The diffraction grating of claim 16, wherein:

the diffraction order associated with the lowest loss is the fifth order.

19. The diffraction grating of claim 16, wherein:

the reflective material is at least one of the following: gold material, aluminum material and silver material.

20. The diffraction grating of claim 16, further comprising:

a substantially planar substrate on which the reflective material is formed.

21. A diffraction grating, comprising:

a reflective material having a blazed surface with a blaze angle between about 50 degrees and about 56 degrees; and an optically transmissive material disposed adjacent the reflective material and having an index of refraction (n), wherein the blazed surface of the reflective material has approximately $(250\pm30)*n$ number of grooves per millimeter such that the diffraction grating has an efficiency of at least 60% for all polarization states over the C-band wavelength range.

22. The diffraction grating of claim 21, wherein:

the number of grooves per millimeter for the reflective material is between about 220 and about 280; and the index of refraction of the optically transmissive material is approximately 1.0.

23. The diffraction grating of claim 21, wherein:

the diffraction order associated with the lowest loss is the fourth order.

24. The diffraction grating of claim 21, wherein:

the reflective material is at least one of the following: gold material, aluminum material and silver material.

25. A wavelength division device, comprising:

a plurality of first coupling components, each first component being capable of receiving a distinct carrier for carrying a signal;

a second coupling component disposed adjacent the first coupling components and capable of receiving a distinct carrier for carrying one or more signals; and a diffraction grating optically coupled to each carrier received by the first and second coupling components, comprising:

a blazed reflective material having a number of grooves per millimeter and a blazed angle between about 27 degrees and about 39 degrees; and an optically transmissive material disposed adjacent the reflective material and having an index of refraction (n), wherein the number of grooves per millimeter is approximately equal to $(500\pm110)*n$ such that the diffraction grating has an efficiency of at least 80% for all polarization states over at least one of the C-band and L-band wavelength ranges.

26. The wavelength division device of claim 25, wherein:

the index of refraction of the optically transmissive material is between about 1.44 and about 1.64;

the number of grooves per millimeter on the diffraction grating is between about 710 and about 790; and the blaze angle is between about 27 degrees and about 32 degrees.

27. The wavelength division device of claim 25, wherein:

the diffraction order associated with the lowest loss is the first order.

28. The wavelength division device of claim 25, wherein:

the index of refraction of the optically transmissive material is between about 1.44 and about 1.64;

the number of grooves per millimeter on the diffraction grating is between about 850 and about 950; and the blaze angle is between about 32 degrees and about 34 degrees.

29. The wavelength division device of claim 25, wherein:

the index of refraction of the optically transmissive material is between about 1.44 and about 1.64;

the number of grooves per millimeter on the diffraction grating is between about 950 and about 1050; and the blaze angle is between about 34 degrees and about 39 degrees.

30. A wavelength division device, comprising:

a plurality of first coupling components, each first component being capable of receiving a distinct carrier for carrying a signal;

a second coupling component disposed adjacent the first coupling components and capable of receiving a distinct carrier for carrying one or more signals; and a diffraction grating optically coupled to each carrier received by the first and second coupling components, comprising:

a blazed reflective material having a number of grooves per millimeter and a blaze angle between about thirty-seven and about forty degrees; and an optically transmissive material disposed adjacent the reflective material and having an index of refraction (n), wherein the number of grooves per millimeter is approximately equal to $(200\pm40)*n$ such that the diffraction grating has an efficiency of at least 60% for all polarization states over the C-band wavelength range.

31. The wavelength division device of claim 30, wherein:
the diffraction order associated with the lowest loss is the fourth order.
32. The wavelength division device of claim 30, wherein:
the reflective material comprises at least one of the following materials: gold material, aluminum material and silver material.
33. The wavelength division device of claim 30, wherein:
the index of refraction is between about 1.44 and about 1.64; and
the number of grooves per millimeter of the diffraction grating is between about 260 and about 340.
34. The wavelength division device of claim 30, wherein:
the diffraction grating includes a substantially planar substrate.
35. A wavelength division device, comprising:
a plurality of first coupling components, each first component being capable of receiving a distinct carrier for carrying a signal;
a second coupling component disposed adjacent the first coupling components and capable of receiving a distinct carrier for carrying one or more signals; and
a diffraction grating optically coupled to each carrier received by the first and second coupling components, comprising:
a blazed reflective material having a number of grooves per millimeter and a blaze angle between about forty-one and about forty-four degrees; and
an optically transmissive material disposed adjacent the reflective material and having an index of refraction (n), wherein the number of grooves per millimeter is approximately equal to (450±40)*n such that the diffraction grating has an efficiency of at least 70% for all polarization states over the C-band wavelength range.
36. The wavelength division device of claim 35, wherein:
the diffraction order associated with the lowest loss is the second order.
37. The wavelength division device of claim 35, wherein:
the reflective material of the diffraction grating comprises at least one of the following materials: gold material, silver material and aluminum material.
38. The wavelength division device of claim 35, wherein:
the index of refraction is between about 1.44 and about 1.64; and
the number of grooves per millimeter on the diffraction grating is between about 560 and about 640.
39. The wavelength division device of claim 35, wherein:
the diffraction grating includes a substantially planar substrate.
40. A wavelength division device, comprising:
a plurality of first coupling components, each first component being capable of receiving a distinct carrier for carrying a signal;
a second coupling component disposed adjacent the first coupling components and capable of receiving a distinct carrier for carrying one or more signals; and
a diffraction grating optically coupled to each carrier received by the first and second coupling components, comprising:
a blazed reflective material having a number of grooves per millimeter and a blaze angle between about sixty-eight and about seventy-six degrees; and
an optically transmissive material disposed adjacent the reflective material and having an index of refraction (n), wherein the number of grooves per millimeter is approximately equal to (200±20)*n such that the diffraction grating has an efficiency of at least 60% for all polarization states over at least one of the C-band and L-band wavelength ranges.
41. The wavelength division device of claim 40, wherein:
the diffraction order associated with the lowest loss is the fifth order.
42. The wavelength division device of claim 40, wherein:
the reflective material of the diffraction grating comprises at least one of the following materials: gold material, aluminum material and silver material.
43. The wavelength division device of claim 40, wherein:
the index of refraction is approximately one; and
the number of grooves per millimeter appearing on the diffraction grating is between about 180 and about 220.
44. The wavelength division device of claim 40, wherein:
the diffraction grating includes a substantially planar substrate.
45. A wavelength division device, comprising:
a plurality of first coupling components, each first component being capable of receiving a distinct carrier for carrying a signal;
a second coupling component disposed adjacent the first coupling components and capable of receiving a distinct carrier for carrying one or more signals; and
a diffraction grating optically coupled to each carrier received by the first and second coupling components, comprising:
a blazed reflective material having a number of grooves per millimeter and a blaze angle between about fifty and about fifty-six degrees; and
an optically transmissive material disposed substantially adjacent the reflective material having an index of refraction (n), wherein the number of grooves per millimeter is approximately equal to (250±30)*n such that the diffraction grating has an efficiency of at least 60% for all polarization states over the C-band wavelength range.
46. The wavelength division device of claim 45, wherein:
the diffraction order associated with the lowest loss is the fourth order.
47. The wavelength division device of claim 45, wherein:
the reflective material of the diffraction grating comprises at least one of the following materials: gold material, aluminum material and silver material.
48. The wavelength division device of claim 45, wherein:
the diffraction grating includes a substantially planar substrate.
49. The wavelength division device of claim 45, wherein:
the index of refraction of the optically transmissive material is approximately one; and
the number of grooves per millimeter appearing on the diffraction grating is between about 220 and about 280.
50. A diffraction grating, comprising:
a reflective material having a blazed surface of grooves with a blaze angle between about 27 degrees and about 39 degrees; and
an optically transmissive material disposed adjacent the reflective material and having an index of refraction (n), wherein the number of grooves per millimeter on the blazed surface of the reflective material is a function of the index of refraction (n) such that the diffraction grating has an efficiency of at least 80% for all polarization states over at least one of the C-band and L-band wavelength ranges.

51. A diffraction grating, comprising:
a reflective material having a blazed surface of grooves with a blaze angle between about 37 degrees and about 40 degrees; and
an optically transmissive material disposed adjacent the reflective material and having an index of refraction (n), wherein the number of grooves per millimeter on the blazed surface of the reflective material is a function of the index of refraction (n) such that the diffraction grating has an efficiency of at least 60% for all polarization states over the C-band wavelength range.

52. A diffraction grating, comprising:
a reflective material having a blazed surface of grooves with a blaze angle between about 41 degrees and about 44 degrees; and
an optically transmissive material disposed adjacent the reflective material and having an index of refraction (n), wherein the number of grooves per millimeter on the blazed surface of the reflective material is a function of the index of refraction (n) such that the diffraction grating has an efficiency of at least 70% for all polarization states over the C-band wavelength range.

53. A diffraction grating, comprising:
a reflective material having a blazed surface of grooves with a blaze angle between about 68 degrees and about 76 degrees; and
an optically transmissive material disposed adjacent the reflective material and having an index of refraction (n), wherein the number of grooves per millimeter on the blazed surface of the reflective material is a function of the index of refraction (n) such that the diffraction grating has an efficiency of at least 60% for all polarization states over at least one of the C-band and L-band wavelength ranges.

54. A diffraction grating, comprising:
a reflective material having a blazed surface of grooves with a blaze angle between about 50 degrees and about 56 degrees; and
an optically transmissive material disposed adjacent the reflective material and having an index of refraction (n), wherein the number of grooves per millimeter on the blazed surface of the reflective material is a function of the index of refraction (n) such that the diffraction grating has an efficiency of at least 60% for all polarization states over the C-band wavelength range.

* * * * *